United States Patent [19]

Taguchi et al.

[11] Patent Number: 5,685,943
[45] Date of Patent: Nov. 11, 1997

[54] FILM APPLYING APPARATUS

[75] Inventors: Hiroshi Taguchi, Itabashi-ku; Yoji Washizaki, Kitakatsushika-gun, both of Japan

[73] Assignee: Somar Corporation, Tokyo, Japan

[21] Appl. No.: 510,875

[22] Filed: Aug. 3, 1995

[30] Foreign Application Priority Data

May 23, 1995 [JP] Japan .................... 7-123455

[51] Int. Cl.$^6$ .................................. B32B 31/00
[52] U.S. Cl. .................... 156/521; 156/522; 156/270
[58] Field of Search ........................ 156/521, 522, 156/250, 270

[56] References Cited

U.S. PATENT DOCUMENTS

| | | | |
|---|---|---|---|
| 5,110,391 | 5/1992 | Taguchi et al. | 156/250 |
| 5,110,400 | 5/1992 | Nagafuchi et al. | 156/521 |
| 5,114,526 | 5/1992 | Taguchi et al. | 156/361 |
| 5,131,972 | 7/1992 | Seki et al. | 156/552 |
| 5,162,071 | 11/1992 | Nagafuchi et al. | 156/517 |
| 5,176,784 | 1/1993 | Nagafuchi et al. | 156/510 |
| 5,211,800 | 5/1993 | Taguchi et al. | 156/521 |
| 5,240,545 | 8/1993 | Washizaki et al. | 156/360 |
| 5,356,501 | 10/1994 | Washizaki et al. | 156/256 |

FOREIGN PATENT DOCUMENTS 63-117487  5/1988  Japan .
7-35101    2/1995  Japan .

Primary Examiner—David A. Simmons
Assistant Examiner—Linda L. Gray
Attorney, Agent, or Firm—Oliff & Berridge

[57] ABSTRACT

A film applying apparatus for applying a film including a photosensitive layer to a printed circuit board and the like, a film holding member for wrapping the leading edge of a film and stationary-knife support members are supported on the same fore-and-aft guide rails for synchronous reciprocating movement relative to a film passage plane; the film holding member is floatingly supported by floating mechanisms for movement in a direction perpendicular to a base-plate conveyance plane I—I; and the film holding member is driven by the tacking member via pressure mechanisms to move between a position in which it is spaced from the stationary-knife support members, and a position in which it comes in contact with the stationary-knife support members.

7 Claims, 13 Drawing Sheets

FIG. 10A 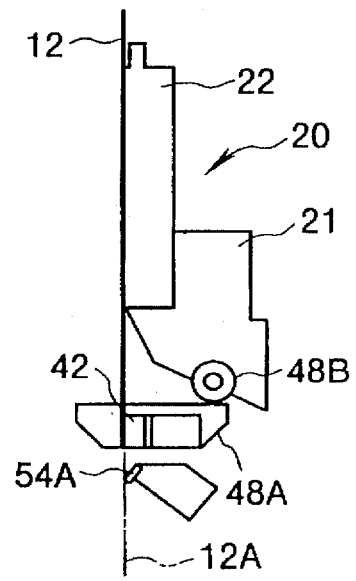 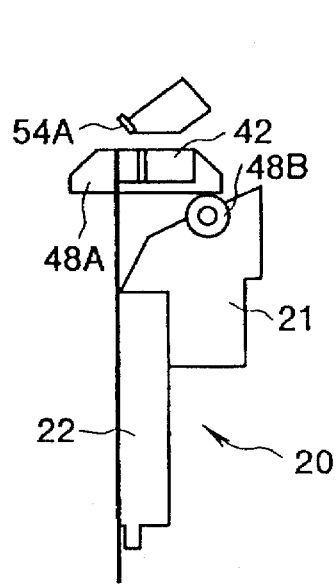
FIG. 10B 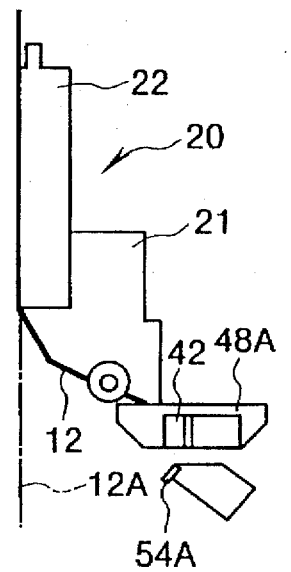 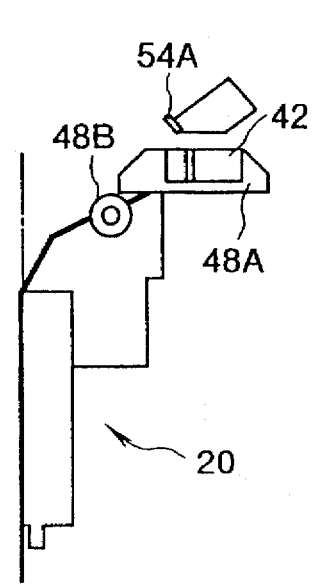
FIG. 10C 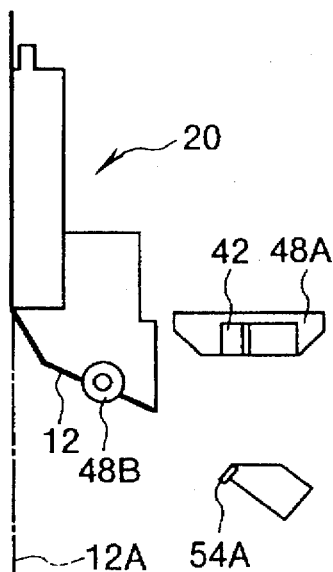 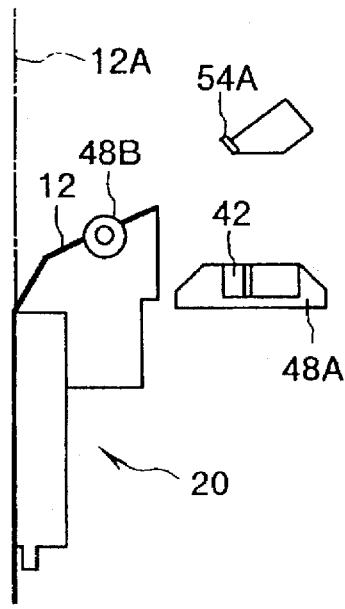

FIG. 12A
FIG. 12B
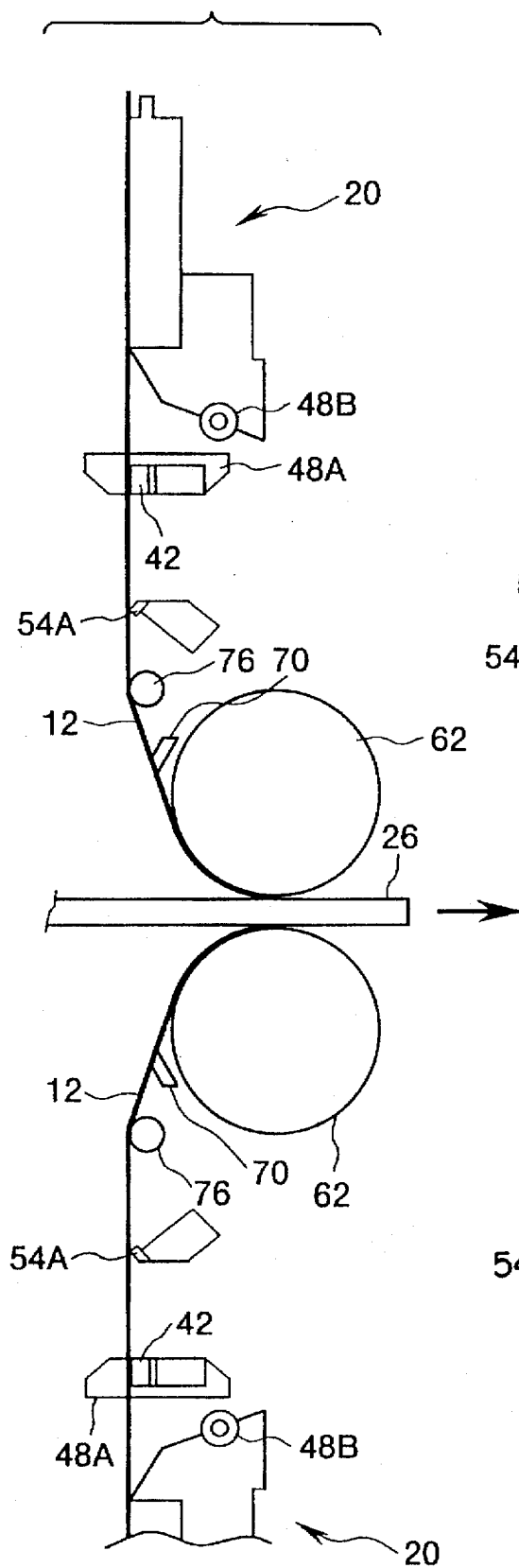
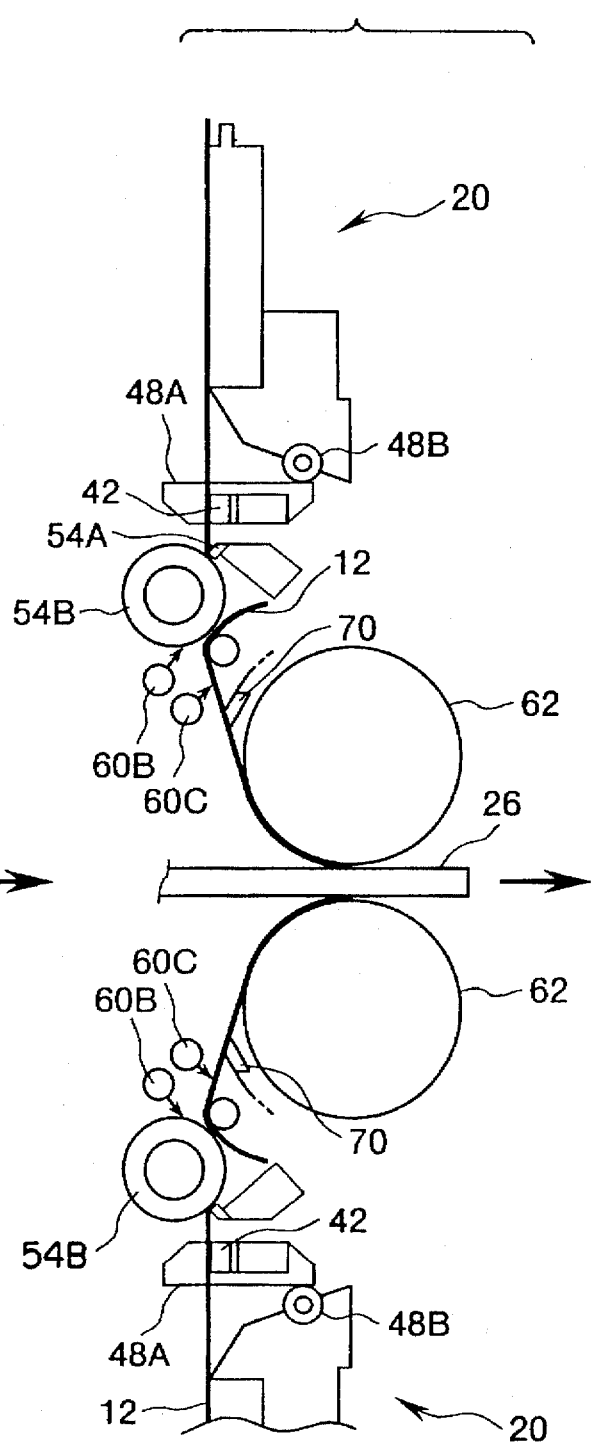

000# FILM APPLYING APPARATUS

BACKGROUND OF THE INVENTION

1. Field of the Invention

This invention relates to a method and apparatus for applying a film to the surface of a base plate for a printed circuit board, for example.

2. Description of the Prior Art

In a process for the manufacture of printed circuit boards used for electronic equipment such as computers, a laminated film consisting of a light-transmissible support film (base film generally represented by a synthetic resin film made from polyester), a photosensitive resin layer and a cover film is applied onto a conductive surface layer of a printed circuit board after the cover film is separated or removed. Then, a circuit pattern film is laid over the laminated film and, thereafter, the photosensitive resin layer is exposed for a predetermined period of time via the circuit pattern film and the light-transmissible support film. Subsequently, the light-transmissible film is removed, and after that the exposed photosensitive resin layer is developed to fabricate an etching mask pattern which is subsequently used to remove a unnecessary portion of the photosensitive resin layer by etching to thereby produce a printed circuit board having a predetermined circuit pattern.

An apparatus used for applying the laminated film is constructed such that a continuous laminated film wound on a film supply roll is first guided to the leading end of a base plate being conveyed by a conveying means, with the photosensitive resin layer located on a base plate side, then tacked or temporarily applied to the leading end of the base plate by a tacking member movable toward and away from the base plate, and thereafter applied, under pressure, to the base plate by a lamination roll while the base plate is being conveyed. The pressure application of the film to the base plate is achieved so that the length of application of the film is substantially equal to the length of the base plate. To this end, the supplied film is cut off or severed into pieces of the predetermined application length by a film cutting means disposed adjacent to the tacking member. The cover film is separated or removed either in front of or alternatively behind the film tacking means.

The film tacking means, as disclosed in Japanese Patent Laid-open Publication No. 63-117487, for example, is composed of a main vacuum suction plate having in its front surface a plurality of suction holes (grooves) for holding the film on the front surface by suction, and a film tacking member disposed on a leading end of the main vacuum suction plate and having a round or triangular shape in cross section. The film tacking means, as a whole, is movable toward and away from the base plate to achieve film supplying and tacking operation.

The film tacking means may accompany a film holding member which has a front end provided with suction holes (grooves) and is disposed adjacent to a base plate side of the film tacking means, as disclosed in Japanese Patent Publication No. 7-35101, for example. The film holding member while holding a leading edge of film by suction is retracted from a film passage plane to cause the leading film edge to wrap around and then adhere to the rounded or triangular leading end of the film tacking means by suction.

When the film is to be cut or severed, the film holding member is slightly moved toward the base plate in synchronism with the movement of the tacking member to hold, by suction, a portion of the film adjacent a predetermined cutting portion, thereby exerting a tension on the trailing end of the film while the film is being cut.

The film tacking means, when achieving the film supply and tacking operation, moves toward the base plate while the film is held on the front surface of the tacking member. Upon completion of the film supplying and tacking operation, the film tacking means ceases from holding the film by suction and then moves in a direction away from the base plate. With cease of the suction on the film, the film is placed in a condition spaced from the front surface of the film tacking means.

Subsequent to the tacking, the film is pressure-bonded or applied with pressure to the base plate by means of a lamination roll while the base plate is being conveyed. During that time, the film is kept free from engagement with the front surface of the film tacking means.

When the film is to be applied to each of base plates fed in succession, the film supply and tacking operation and the subsequent pressure-bonding operation are repeated frequently.

The leading end of the film tacking member is provided with a heater by means of which the leading end of the film tacking member is heated to ensure tacking of the film relative to the leading end of the base plate.

As disclosed in Japanese Patent Laid-open Publication No. 63-117478 specified above, the cover film is generally separated or removed in front of the tacking member of the film applying apparatus.

In the thin film applying apparatus disclosed in aforesaid Japanese Patent Publication No. 7-35101, the film cutting means comprises a rotary cutter composed of a stationary knife and a rotary knife. The stationary knife is movable back and forth in a direction perpendicular to the film passage plane. The film holding member is movable back and forth together with the stationary knife and also movable relative to the stationary knife in the direction of movement of the film.

To achieve this movement, a mechanism is provided, including connecting bars extending upwardly from a stationary-knife support member in parallel relation to the film passage plane. The film holding member is slidably coupled with the connecting bars for movement along the latter.

The stationary-knife support member is mounted via support rails on a body of the apparatus and movable back and forth by a pneumatic cylinder in the direction perpendicular to the film passage plane.

The rotary knife which constitutes one part of the rotary cutter must be displaced away from the stationary knife to permit passage of the leading edge of the film through a space between the rotary and stationary knives for setting the film supply roll. To this end, the thin film applying apparatus disclosed in the aforesaid Japanese Patent Publication No. 7-35101 further includes sliding members supporting thereon the rotary knife and slidably mounted on the body of the apparatus, and locking knobs for locking the sliding members in a cutting position of the rotary cutter and a standby position remote from the cutting position.

In the thin film applying apparatus disclosed in the aforesaid Japanese Patent Publication No. 7-35101, since the film holding member is driven, via the stationary-knife support member and the connecting bars, in a direction perpendicular to the film passage plane, the connecting bars are subjected to a bending force or a shearing force tending to bend or deform the connecting bars to such an extent as to cause a malfunction of the film holding member, or sometimes break the connecting bars.

A further problem is that when the rotary knife of the rotary cutter is moved first in one direction from the cutting position to the standby position remote from the film passage plane and then in the opposite direction from the standby position to the cutting position so as to replace the film, the locking knobs must be pulled out to unlock or release the rotary knife from the body of the apparatus. Such manual pulling operation requires an uneasy working posture in which the operator grips the knobs with its fingers while stretching out both hands from the outside of the apparatus. The apparatus is, therefore, extremely uneasy to manipulate.

The tacking member must be stopped exactly at a film-sucking position, a film-tacking position and a film-cutting position. For this purpose, it may be considered that the tacking member is driven by a servomotor, the number of revolution of which is detected in terms of pulses to perform a control of the servomotor according to the detected values. However, since the base plates to be applied with films have various different thickness, this arrangement would encounter difficulties that a preset pulse number in a controller must be changed each time a base plate of a different thickness is to be processed.

Furthermore, even if stopping of the tacking member at the exact tacking position is achievable by virtue of a controller of improved controlling accuracy, a tacking failure is still unavoidable because the servomotor can only generate a torque insufficient to produce the necessary pressure.

In the case where two films are to be applied to opposite surfaces of a base plate, two said tacking members are operated in synchronism with each other to grip the base plate from upper and lower sides. In this case, if the base plate carried on base-plate conveyor rollers is displaced upwardly from a reference position, the lower tacking member can only exert an insufficient pressure on the base plate via a film disposed therebetween, thus causing a tacking failure.

SUMMARY OF THE INVENTION

With the foregoing problems of the prior art in view, it is an object of the present invention to provide a film applying method and an apparatus for carrying out the same, which are capable of guaranteeing reliable operation of a film holding member without causing malfunction or involving breakage of a member used for guiding the film holding member in parallel with the film.

Another object of the present invention is to provide a film applying method which is capable of temporarily applying or tacking a film onto a base plate with reliability.

A further object of the present invention is to provide a film applying apparatus which is capable of facilitating easy unlocking a rotary knife of a rotary cutter for the subsequent movement of rotary knife toward and away from a stationary knife.

The present invention has solved the above-described problems by a film applying method of the type, wherein a continuous film composed of a light-transmissible support film, a photosensitive resin layer and a cover film laminated one above another is withdrawn from a film supply roll, and after the cover film is separated, the continuous film is guided to the vicinity of a leading end of a base plate conveyed by a conveying means, with the photosensitive resin layer situated on a base plate side, while the film is held by suction on a tacking member which is movable toward and away from the base plate and also on a film holding member which is disposed adjacent to the tacking member at a base plate side thereof, subsequently the film holding member is retracted for causing a leading edge of the film to wrap around a leading end of the tacking member, then the leading edge of the film is tacked onto the leading end of the base plate by the tacking member, thereafter the film is pressure-bonded to the base plate by lamination rolls while the base plate is being conveyed, wherein when said pressure-bonding is started, the tacking member is spaced from the base plate along a film passage plane, wherein before the film is cut, while the tacking member is moved toward the base plate in synchronism with movement of the film, the film is held by suction on the tacking member at a portion upstream of a predetermined cutting portion, then while the film holding member, which has been standing by at an advanced position located on the film passage plane, is moved in synchronism with movement of the tacking member, the film is held by suction on the film holding member at a portion immediately upstream of the predetermined cutting portion, subsequently, while the tacking member and the film holding member are moved in synchronism toward the base plate, the film is cut by a rotary cutter composed of a rotary knife rotatable about an axis of rotation extending parallel to the film passage plane, and a stationary knife movable toward and away from the rotary knife, and the tacking member and the film holding member are stopped before the film holding member comes in contact with the stationary knife of the rotary cutter.

Further, in the film applying method of the present invention, the film holding member is movably supported along the film passage plane and is urged in a direction away from a base-plate conveyance plane, and when the tacking member moves in synchronism with movement of the film toward the base plate immediately before the film is cut, the film holding member comes in contact with the tacking member and then is forced by the latter to move toward the base plate in synchronism with movement of the tacking member.

Furthermore, in the film applying method of the present invention, the film supply roll, the tacking member, the film holding member and the lamination roll are disposed on each of upper and lower sides of the base-plate conveyance plane to apply two said films to opposite surfaces of the base plate, and when the films are tacked to the base plate, the tacking member on one side is stopped while one film is held in contact with one surface of the base plate by the leading end of the same tacking member, and while keeping this condition, the other film is forced against the other surface of the base plate by the leading end of the tacking member on the opposite side, so that the two films are forced against the opposite surfaces of the base plate with the base plate gripped between the leading ends of the two tacking members.

Furthermore, in the film applying method of the present invention, base plate is conveyed on the conveying means disposed horizontally, the tacking member on said one side is kept to be on standby while being held in contact with the under surface of the base plate on the conveying means via one film, and the tacking member on said other side is brought into contact with the base plate on the upper surface of the conveying means via the other film.

Furthermore, in the film applying method of the present invention, when the film is tacked onto the leading end of the base plate by the leading end of the tacking member, the tacking member performs its stroke from an original position which is remote from a base-plate conveyance plane, toward the base-plate conveyance plane in such a manner that from the original position to a position close to the base-plate conveyance plane, the tacking member is driven by a motor while the position of the tacking member is controlled according to a detected number of revolution of the motor, and from said position close to the base-plate conveyance plane to a position where the tacking member comes in contact with the base plate via the film, the tacking member is driven by a cylinder device, and the tacking member performs its stroke returning to the original position in such a manner that from said position of contact with the base plate to a position close to the original position, the tacking member is driven by the motor while the position of the tacking member is controlled according to a detected number of revolution of the motor, and from said position close to the original position, the tacking member is driven by the cylinder device.

Furthermore, in the film applying method of the present invention, in said return stroke, form said position of contact with the base plate to said position close to the original position, the tacking member is driven jointly by the motor and the cylinder device.

Furthermore, in the film applying method of the present invention, in said stroke approaching the base-plate conveyance plane, the tacking member is stopped at said position close to the base-plate conveyance plane, and after the base plate is conveyed to a tacking position, the tacking member is driven by said cylinder device to tack the leading edge of the film onto the base plate.

The present invention has solved the above-described problems by a film applying apparatus of the type, wherein a continuous film composed of a light-transmissible support film, a photosensitive resin layer and a cover film laminated one above another is withdrawn from a film supply roll, and after the cover film is separated, the continuous film is guided to the vicinity of a leading end of a base plate conveyed by a conveying means, with the photosensitive resin layer situated on a base plate side, while the film is held by suction on a tacking member which is movable toward and away from the base plate and also on a film holding member which is disposed adjacent to the tacking member at a base plate side thereof, subsequently the film holding member is retracted for causing a leading edge of the film to wrap around a leading end of the tacking member, then the leading edge of the film is tacked onto the leading end of the base plate by the tacking member, thereafter the film is pressure-bonded to the base plate by lamination rolls while the base plate is being conveyed, wherein when said pressure-bonding is started, the tacking member is spaced from the base plate along a film passage plane, and subsequently the film is cut at a position close to the film holding member by a rotary cutter composed of a rotary knife rotatable about an axis of rotation extending parallel to the film passage plane, and a stationary knife movable toward and away from the rotary knife, wherein when the film is cut, the film holding member is advanced to the film passage plane to hold the film thereon by suction together with the tacking member, said apparatus further includes; a pair of support bases attached to a body of said apparatus at positions outside the opposite ends of said stationary knife in the widthwise direction of the film and movable in a direction parallel to the direction of feed of the film, a pair of fore-and-aft guide rails disposed on said support bases, respectively, and extending in a direction perpendicular to said film passage plane, and a pair of stationary-knife support members and a pair of film-holding-member support mechanisms that are supported by a pair of movable blocks, respectively, of said fore-and-aft guide rails, wherein said stationary-knife support members support said opposite ends of said stationary-knife and said film-holding-member support mechanisms support opposite ends of said film holding member, wherein said film-holding-member support mechanism includes a pair of springs supporting the film holding member while permitting movement of the film holding member along said film passage plane within a predetermined range of distance and urging the film holding member in a direction away from a base-plate passage plane, and wherein a pair of pressure mechanisms is provided between said film holding member and said film-holding-member support mechanisms for forcing said film holding member against the force of said springs when said tacking member comes close to said film holding member beyond a fixed distance of space and allowing said tacking member to move toward the base plate beyond said film holding member when said film holding member is spaced from the film.

Further, in the film applying apparatus of the present invention, said pressure mechanisms each include a pressure member which is disposed at a position offset toward the base plate from a position located on one side of the film holding member adjacent a leading end thereof and which is engageable with said film holding member to force the latter when said tacking member moves toward the base plate beyond a fixed distance.

Furthermore, in the film applying apparatus of the present invention, said pressure member comprises a roller having an axis of rotation extending parallel to the widthwise direction of the film, each said pressure mechanism is composed of said roller, and a rail extending in a direction perpendicular to said film passage plane and disposed in a corresponding one of said film-holding-member support mechanisms at a portion engageable with said roller, so as to permit said roller to move along said rail while keeping contact with the latter, said rail extending over a limited length within which said film holding member and said tacking member interfere with each other in the feed direction of the film.

Furthermore, in the film applying apparatus of the present invention, said apparatus further includes a rotary-knife support device for movably supporting opposite ends of said rotary knife along said fore-and-aft guide rails and enabling said rotary knife to be fixed at a cutting position in which said rotary knife cooperates with said stationary knife set on said film passage plane to cut the film, and a retracted position spaced away from said film passage surface.

Furthermore, in the film applying apparatus of the present invention, said rotary-knife support device includes a locking projection engageable, at said cutting position and said retracting position, with recessed portions formed in a fixed-rail side of each said fore-and-aft guide, and a spring urging said locking projection toward a projecting direction.

Furthermore, in the film applying apparatus of the present invention, said locking projection is disposed on said fixed rail at an inner side in the widthwise direction of the film and movable to and fro in a widthwise direction of the film, and has a knob at its proximal end, said rotary-knife support device further includes a retainer plate disposed interiorly of, and in confrontation with, said knob in the widthwise direction of the film such that when said knob is gripped with second and third fingers, a first finger can be hooked on said retainer plate.

Furthermore, in the film applying apparatus of the present invention, said locking projection, said knob and said retainer plate are provided in one pair on right and left sides in the widthwise direction of the film, wherein said right and left retainer plates are connected together in the widthwise direction of the film by an air blow-off pipe which is parallel to said rotary knife, disposed close to said film passage surface, and provided for blowing compressed air to the film.

According to the invention of the film applying method, the film holding member is standing by at a position held out of interference with the tacking member when the film is tacked onto the base plate, and it is moved in synchronism with the movement of the tacking member, with the film held by suction on the film holding member and the tacking member, when the film is cut or severed.

Since the film while being cut is held at a position close to the rotary cutter, cutting of the film can be achieved speedily and accurately without causing a slack in the film, and the tacking member can be constructed as a compact and light-weight unit.

When the film is cut, the tacking member forces the film holding member to move the latter in synchronism with the tacking member. Accordingly, the film holding member can be driven without requiring a separate driving device.

According to the invention of the film applying apparatus, the stationary knife and the film holding member are supported on the stationary-knife support member and the film-holding-member support mechanism, respectively, which are supported by the guide rails for movement therealong in a direction perpendicular to the film passage plane. The film holding member is supported such that it is movable relative to the stationary-knife support member in a direction parallel to the feed direction of the film, and urged by the springs in a direction away from the stationary-knife support member. With this construction, a driving force acting in a direction perpendicular to the plane of the film is directly transmitted to the stationary-knife support member and the film holding member without intervention of a power transmission system which would otherwise be bent or broken due to a bending force or a shearing force applied thereto.

BRIEF DESCRIPTION OF THE DRAWINGS

FIGS. 10A, 10B and 10C is a schematic cross-sectional view showing a first stage of operation of the apparatus in the same embodiment;

FIGS. 12A and 12B is a schematic cross-sectional view showing a last stage of operation of the apparatus in the same embodiment.

DESCRIPTION OF THE PREFERRED EMBODIMENTS

A preferred embodiment of the present invention will be described below in greater detail with reference to the accompanying drawings.

Figure 1:
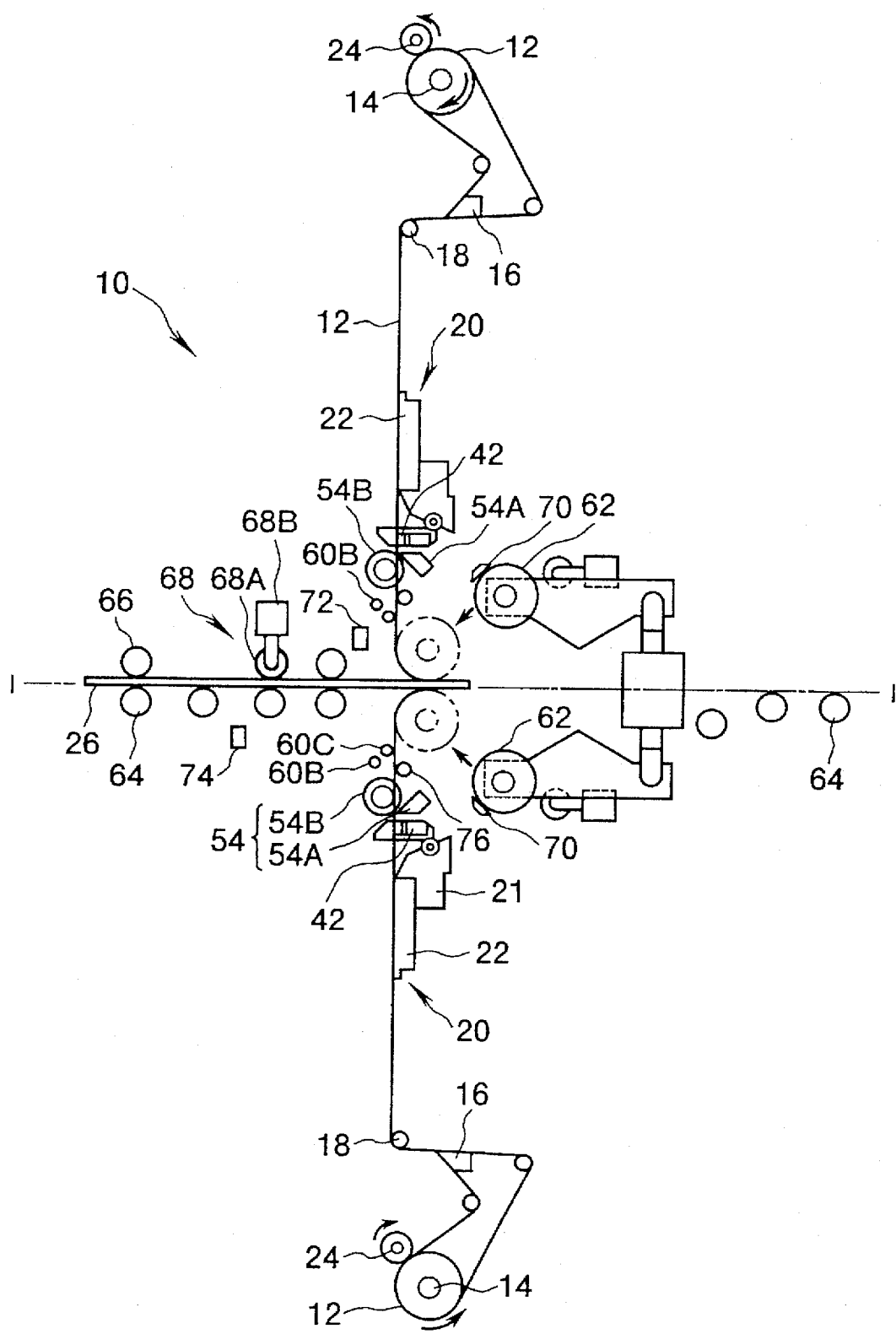
FIG. 1 is a schematic cross-sectional view showing an embodiment of a film applying apparatus according to the present invention.

Referring now to FIG. 1, description will be given of the general construction of a film applying apparatus 10 according to the embodiment of this invention.

Films 12, which are to be cut and applied by the film applying apparatus 10, are each composed of a light-transmissible support film, a photosensitive resin layer and a cover or protective film laminated one above another into a three-ply structure and are available in the form of a laminated film continuously wound on supply rolls 14.

Each film 12 unwound or withdrawn from the corresponding supply roll 14 is divided, by a film separating member 16, into the cover film and a two-ply laminated film composed of the light-transmissible support film and the photosensitive resin layer whose surface to be bonded is uncovered or exposed as a result of separation of the cover film. The two-ply laminated film, hereinafter designated by the same reference character as the starting film, i.e., 12, is supplied via a tension roll 18 to a main vacuum suction plate 22 which constitutes a portion of a tacking member 20. The cover film which is separated from the laminated film 12 is wound on a take-up roller 24.

The supply roll 14, film separating member 16, tension roll 18, tacking member 20 and take-up roll 24 described above are provided, as a single component group, on each side of a horizontal base-plate conveyance plane I—I in symmetrical relation to the opposite component group about the base-plate conveyance plane I—I so that two laminated films 12, 12 can be synchronously attached to upper and lower surfaces of a base plate 26.

Figure 2:
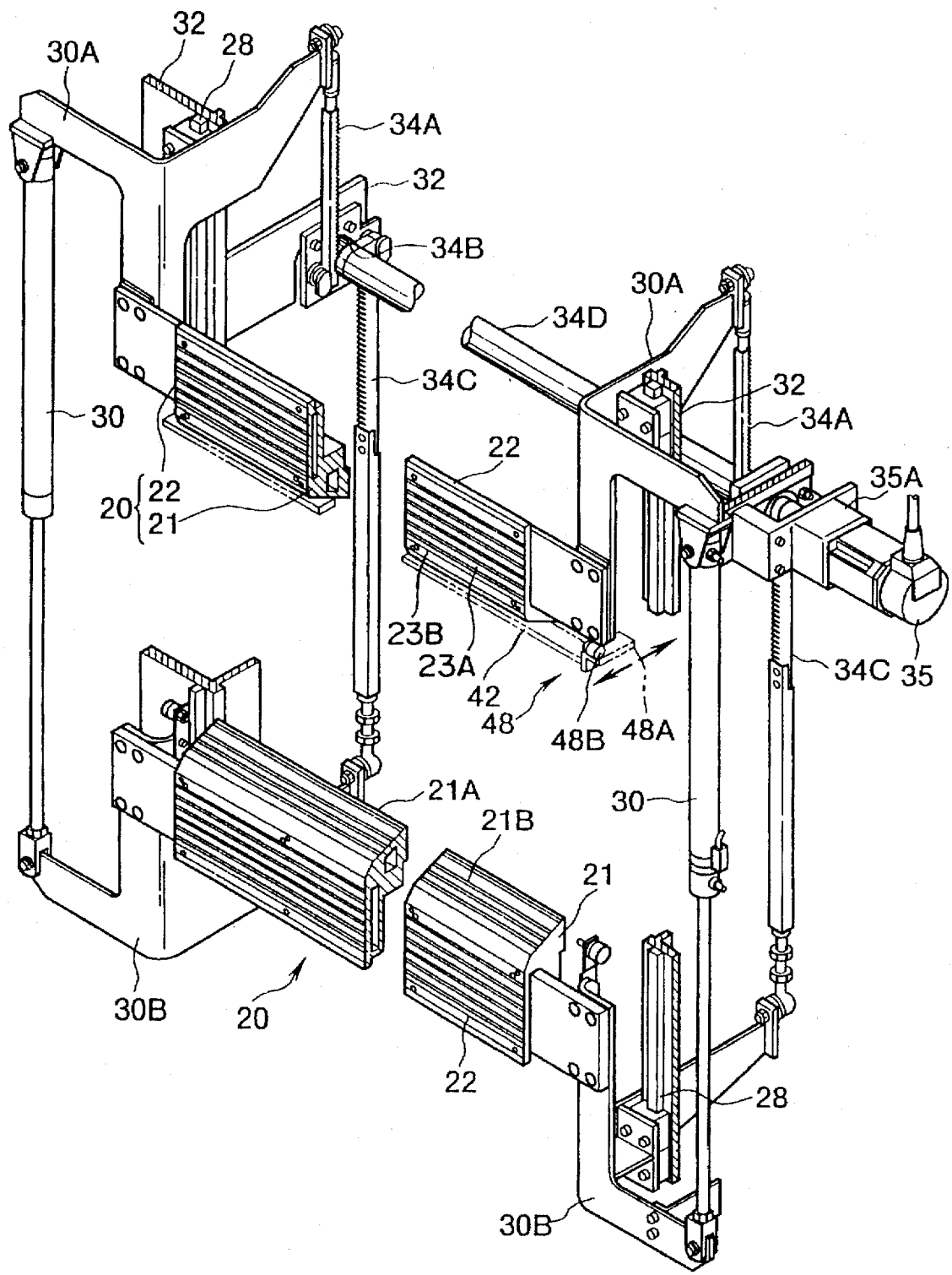
FIG. 2 is a perspective view, partly in cross section, of a tacking member and its driving mechanism in the same embodiment.

Each of the main vacuum suction plates 22, as shown in FIG. 2, has a front surface provided with a number of suction grooves 23A and a number of suction holes 23B for holding a corresponding one of the laminated films 12 on the front surface by suction. The main vacuum suction plates 22, 22 are slidably supported by a pair of parallel spaced vertical guide rails 28, 28 and vertically movable in synchronism with each other along the guide rails 28 in a direction toward and away from a film-applying position, namely the base-plate conveyance plane I—I, by the action of a pair of pneumatic cylinders 30, 30 and a servomotor 35 provided for driving the main vacuum suction plates 22, 22.

Each of the main vacuum suction plates 22 has, at its one end facing the base-plate conveyance plane I—I, a tacking member body 21 having a curved or rounded front surface extending contiguously from the front surface of the main vacuum suction plate 22 and provided with suction grooves 21B for holding the film 12 on the rounded front surface of the tacking-member body 21. The tacking-member body 21 has an end portion, which is a leading end portion 21A as viewed in the direction of feed of the film 12, and includes a heater (not shown) embedded therein in the vicinity of the leading end portion 21A for heating the leading end portion 21A.

The guide rails 28, 28 are attached to a support plate 32 which is provided for the main vacuum suction plates 22 and firmly secured to a mounting frame (not shown) of a body of the apparatus 10.

The pneumatic cylinders 30, 30 are spaced in the widthwise direction of each film 12 and each have a cylinder-side end connected via an upper arm 30A to the upper main vacuum suction plate 22, and a rod-side end connected via a lower arm 30B to the lower main vacuum suction plate 22, so that the upper and lower arms 30A, 30B can be moved toward and away from each other through a rack 34A and a pinion 34B engaged with a rack 34C to drive the upper and lower main vacuum suction plates 22, 22 in synchronism with each other. The pinion 34B is rotatably supported by the support plate 32 provided for the main vacuum suction plates 22, 22.

The left and right pinions 34B, 34B are concentrically secured to a synchronous coupling shaft 34D extending horizontally between the left and right upper arms 30A, 30A. The synchronous coupling shaft 34D has one end (right-hand-side end in FIG. 2) connected to the servomotor 35 so that the left and right pinions 34B, 34B can be driven by the servomotor 35 in synchronism with each other. The servomotor 35 is attached to the support plate 32 via a servomotor holding member 35A.

The tacking member 20 is driven by the pneumatic cylinders 30 and the servomotor 35 in a manner described below.

Figure 3:
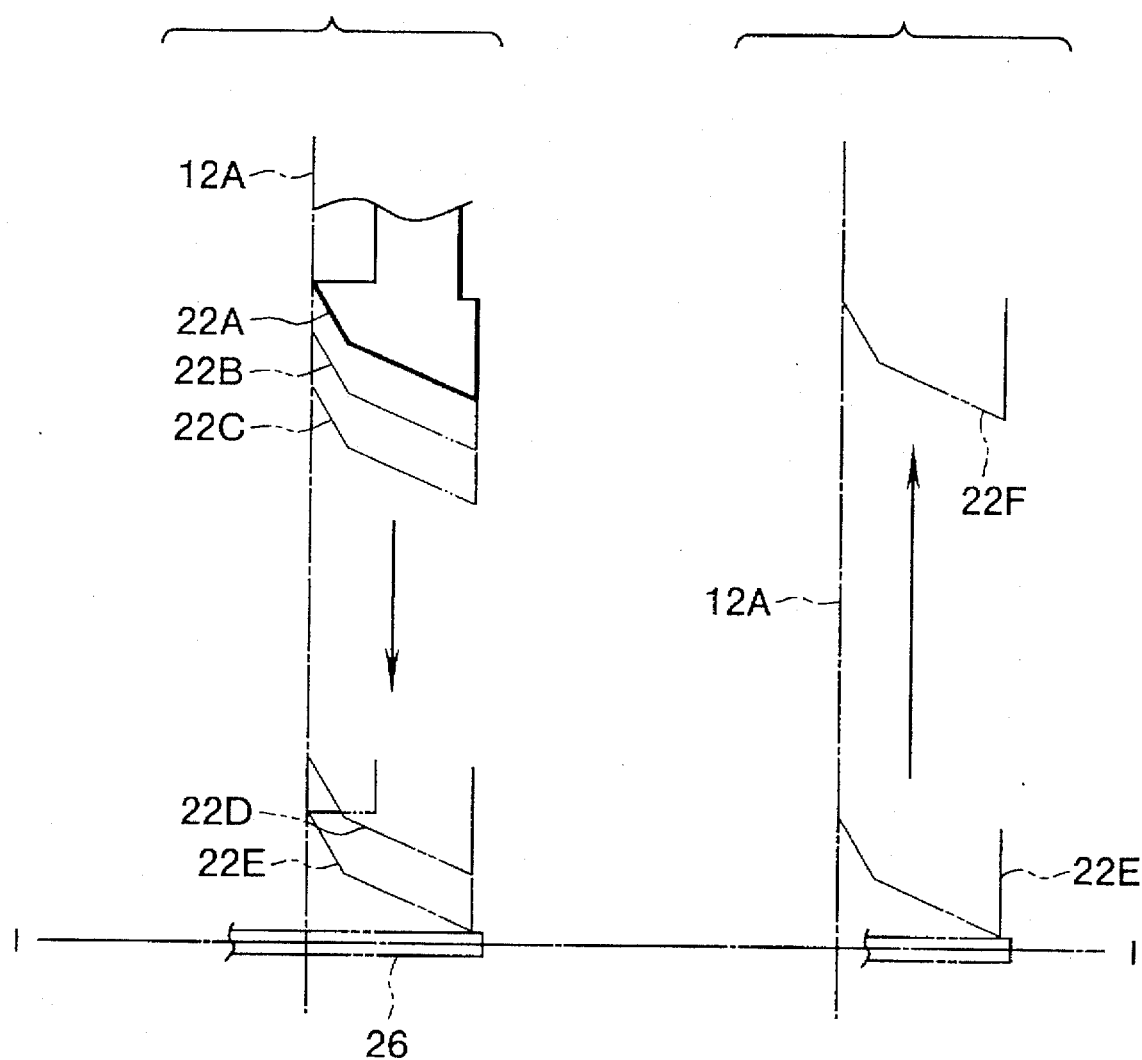
FIGS. 3A and 3B is a front elevational view showing the relationship between a film holding member for wrapping the leading edge of a film and the tacking member in the same embodiment.

As shown in FIG. 3, the tacking member 20 is adapted to move from an original position 22A which is furthest from the base-plate conveyance plane I—I, successively through a manual cutting position 22B, through an automatic cutting position 22C, and through a tacking standby position 22D to the tacking pressure bonding position 22E. From the original position 22A to the tacking standby position 22D, the tacking member 20 is driven by the servomotor 35 and each of the stopping positions is determined by counting the number of pulses generated from a rotary encoder (not shown) in response to rotation of the servomotor 35.

The tacking standby position 22D is upwardly spaced a distance of 20 mm from the base-plate conveyance plane I—I. From this standby position 22D, the tacking member 20 is driven by the pneumatic cylinders 30 toward the tacking pressure bonding position 22E where it is forced by pneumatic pressure against the base plate 26 via the film 12 disposed therebetween.

When the tacking member 20 is moved away from the base plate 26, the pneumatic cylinders 30 and the servomotor 35 drive the tacking member 20 to a switching position 22F which is located close to, and for instance, several millimeters ahead of, the original position 22A. And, from the switching position 22F to the original position 22A, the tacking member 20 is driven only by the pneumatic cylinders 30. When the pneumatic cylinders 30 and the servomotor 35 are used jointly, the amount of movement of the tacking member 20 ranging from the tacking position 22D to the switching position 22F is detected by counting the number of pulses in the same manner as described above.

Although the case may be altered depending on the thickness of the base plate 26, if the tacking member 20 driven by the servomotor 35 moves over a constant distance, the distance from the tacking standby position 22D to the tacking pressure bonding position 22E and the distance from the switching position 22F to the original position 22A can be taken up or absorbed by movement of pistons of the pneumatic cylinders 30. Accordingly, a preset value which is allotted to the number of pulses generated in response to rotation of the servomotor 35 no longer requires to be changed according to the thickness of the base plate 26.

Figure 4:
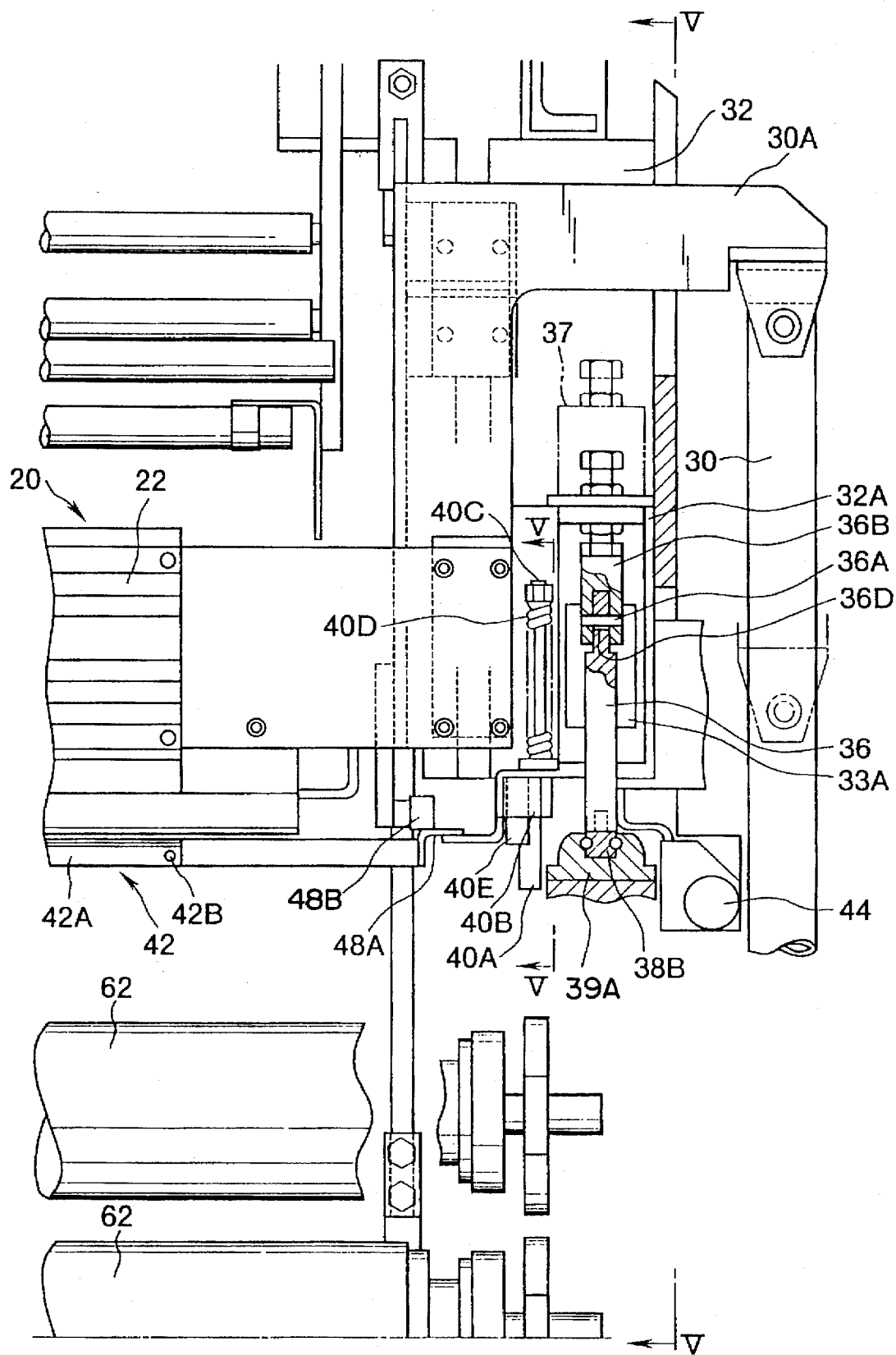
FIG. 4 is a schematic cross-sectional view showing a course of movement of the tacking member.
Figure 5:
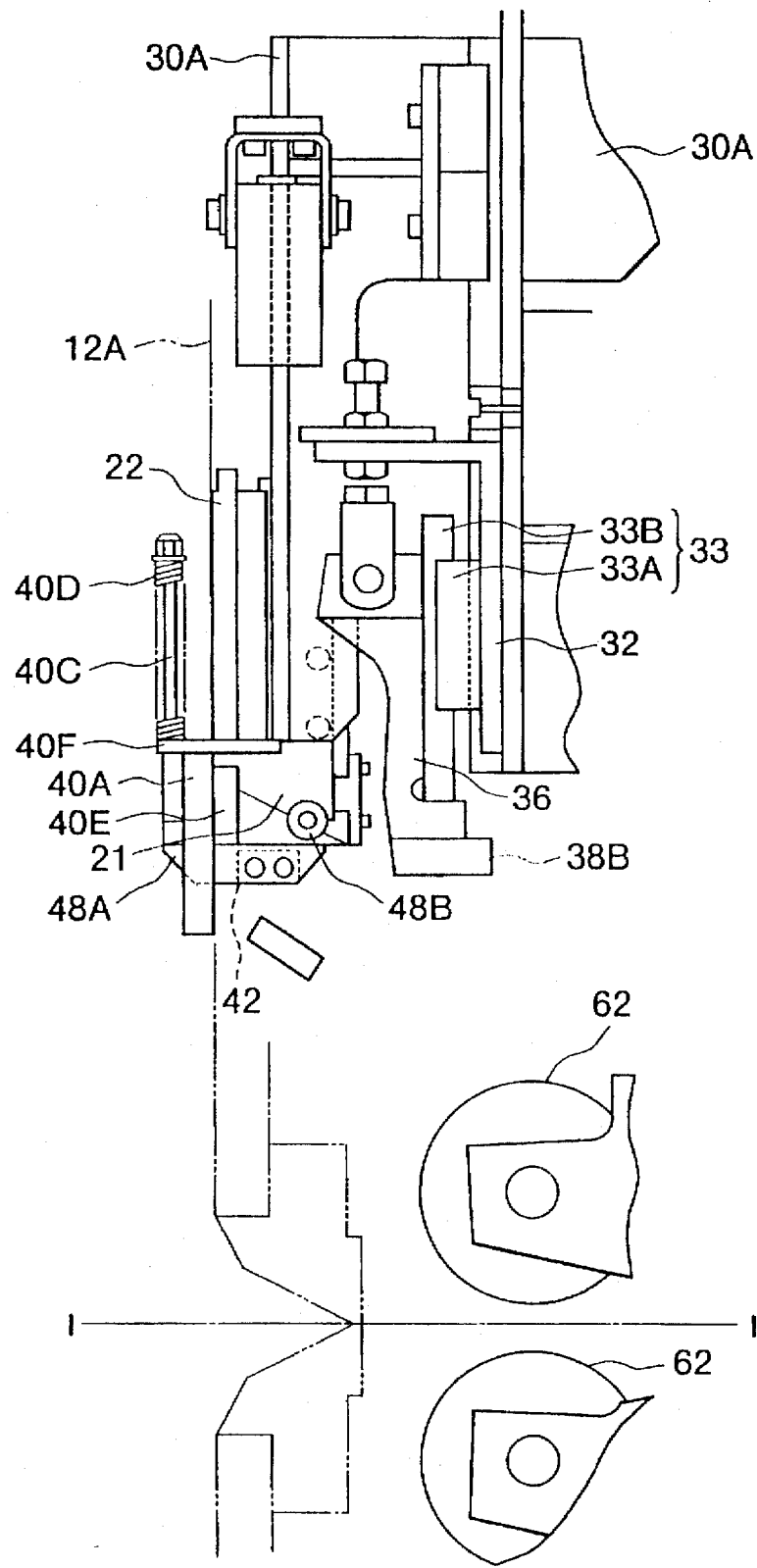
FIG. 5 is a cross-sectional view taken along the line V—V of FIG. 4.
Figure 6:
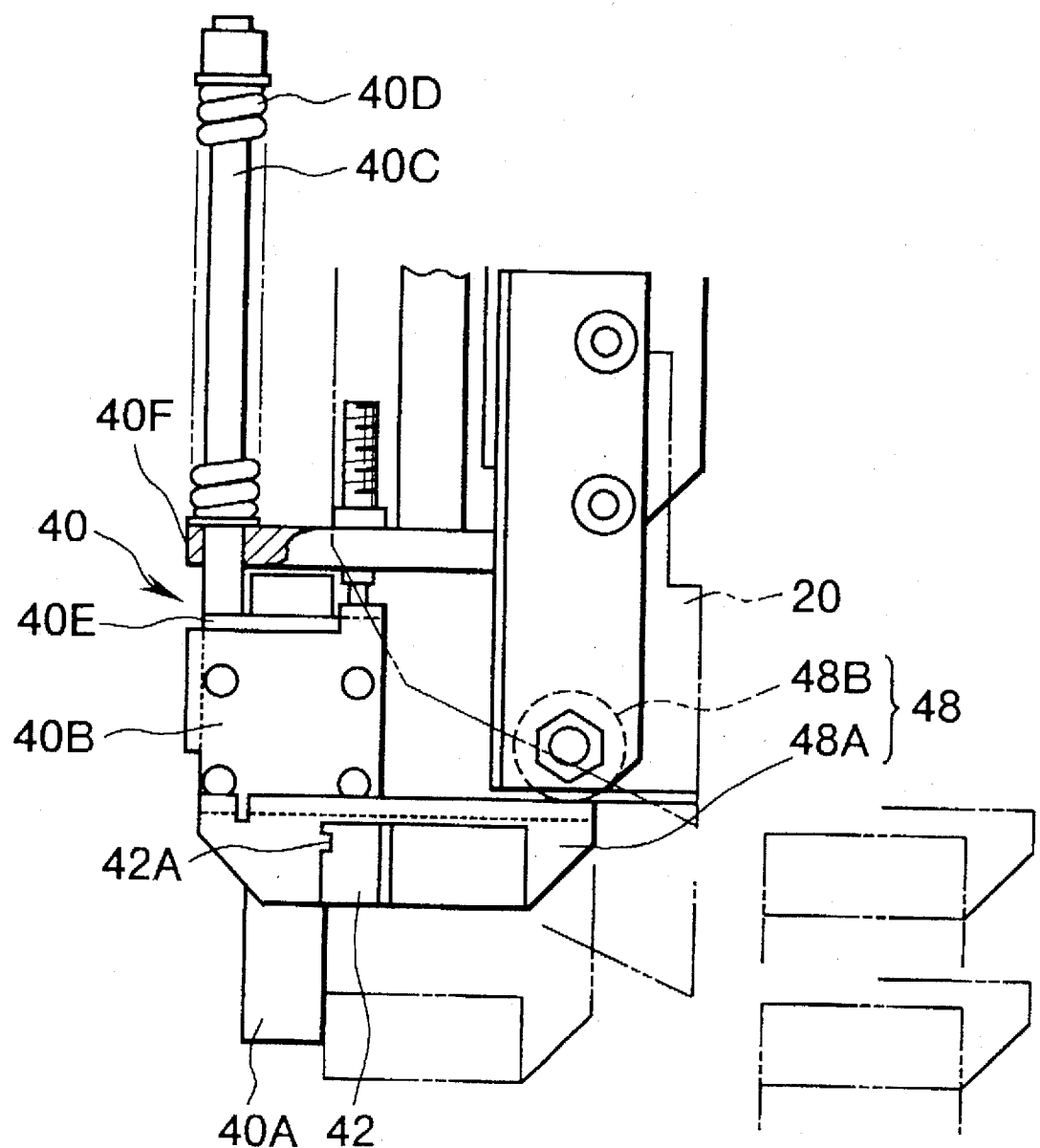
FIG. 6 is an enlarged cross-sectional view taken along the line VI—VI of FIG. 4.

As shown in FIGS. 4–6, a pair of support bases 36 (one being shown) is vertically and movably supported on the support plate 32 via a pair of vertical guide members 33 (one being shown), respectively, and they are disposed on opposite sides of each main vacuum suction plate 22 and aligned in the widthwise direction of the latter.

The vertical guide members 33 are each composed of a guide rail 33A attached to the support plate 32 via a bracket 32A, and a slide member 33B attached to a corresponding one of the support bases 36 and slidably supported by the guide rail 33A.

Figure 8:
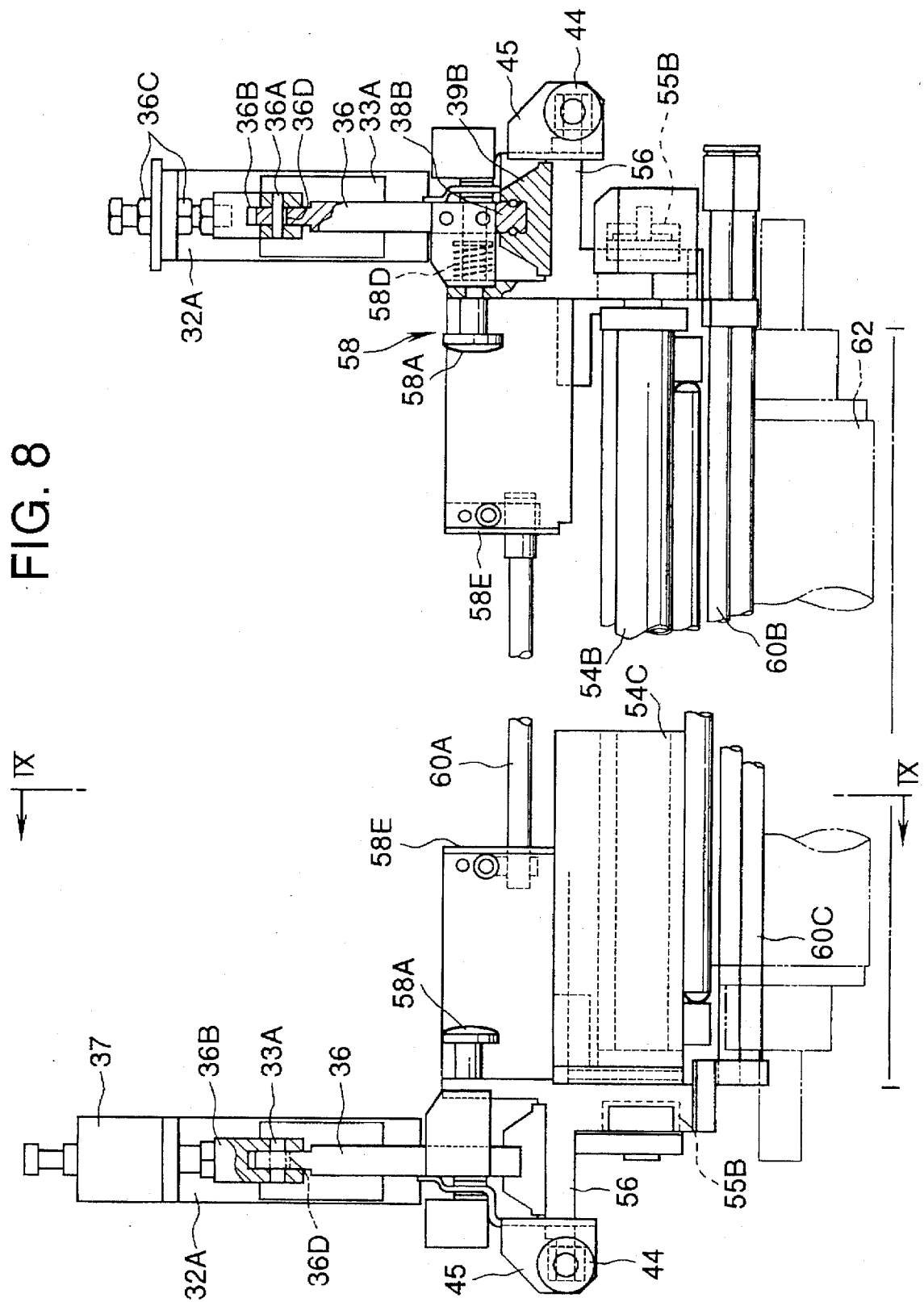
FIG. 8 is a front elevational view showing a rotary knife of a rotary cutter and its moving mechanism of the apparatus in the same embodiment.

The left and right support bases 36, as shown in FIG. 8, each have an upper end connected via a horizontal support pin 36A to a connecting member 36B, the support pin 36A being parallel to a film passage plane 12A. In FIG. 8, the left connecting member 36B is vertically driven by a rotary-cutter angle adjusting device 37 composed of a pneumatic cylinder mounted on the bracket 32A. The right connecting member 36B is supported on a bracket 32A by a pair of nuts 36C so that the connecting member 36B is vertically adjustable in position. The brackets 32A, 32A are secured to the support plate 32 provided for the main vacuum suction plates 22.

Each support base 36 has a hole 36D through which the corresponding support pin 36A extends. The hole 36D has an inside diameter larger than the outside diameter of the support pin 36A.

The rotary-cutter angle adjusting device 37 moves the left support base 36 alone in a vertical direction to tilt a stationary knife 54A and a rotary knife 54B of a rotary cuter 54, described later, in a plane parallel to the film passage plane 12A so that the respective central axes of the stationary and rotary knives 54A, 54B can be tilted at a given angle to the horizontal within a predetermined angular range (0°–5°).

The support bases 36 each have a fore-and-aft guide rail 38 extending in a direction perpendicular to the film passage plane 12A. The fore-and-aft guide rail 38 is composed of a fixed rail 38B secured to the support base 36, and a slide block 38A slidably supported by the fixed rail 38B. The slide block 38A is composed of a stationary-knife supporting movable block 39A and a rotary-knife supporting movable block 39B which are slidable independently from each other.

The stationary-knife supporting movable block 39A floatingly supports each end of a film holding member 42 via a floating mechanism 40. The floating mechanism 40 is composed of a vertical guide rail 40A, a guide frame 40B, an elongated floating shaft 40C, a compression spring 40D, a movable block 40E and a stopper plate 40F.

Figure 7:
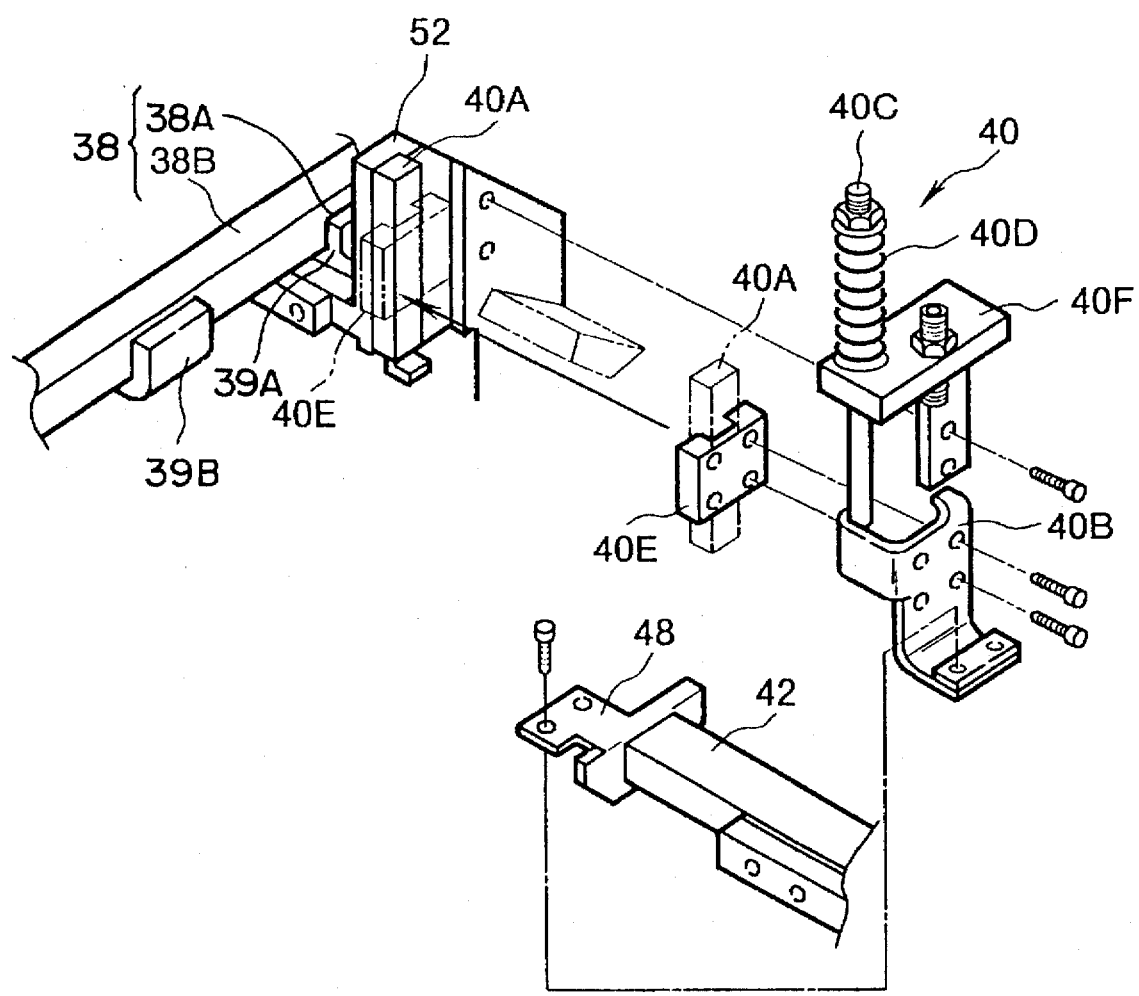
FIG. 7 is an exploded perspective view showing a floating mechanism in the same embodiment.

Stated more specifically, as shown in FIGS. 6 and 7, the stationary-knife supporting movable block 39A has attached thereto the vertical guide rail 40A, and the movable block 40E vertically movably mounted on the vertical guide rail 40A. The movable block 40E is embraced with, and slidably supports thereon, the short tubular guide frame 40B of rectangular cross section. The elongated floating shaft 40C extends vertically upwardly from the guide frame 40B in a direction toward the base-plate conveyance plane I—I, and the compression coil spring 40D is disposed around the floating shaft 40C and acts between a distal end of the floating shaft 40C and the stopper plate 40F so that the guide frame 40B is floatingly supported relative to the guide rail 40A and urged in a direction away from the base-plate conveyance plane I—I. The stopper plate 40F is attached to a stationary-knife support member 52, described later, which is integral with the stationary-knife supporting movable block 39A.

Each guide frame 40B supports one end of the film holding member 42 in the widthwise direction of the latter at a position adjacent to an end of the film holding member 42 at its base-plate conveyance plane I—I side. Thus, the film holding member 42 is floatingly supported relative to the guide rails 40A and floatingly movable in a vertical direction. Further, by virtue of the fore-and-aft guide rails 38, the film holding member 42 is movable back and forth relative to the film passage plane 12A. Yet, the film holding member 42 can be driven in a vertical direction to move within a predetermined range of distance together with the support bases 36.

The film holding member 42 has an end face facing the film passage plane 12A. The end face has a horizontal suction groove 42A and a plurality of suction holes 42B (one being shown) in which a partial vacuum is created to cause the film 12 to adhere to the end face by suction.

Designated by 44 are pneumatic cylinders for driving the stationary-knife supporting movable blocks 39A of the fore-and-aft guide rails 38 to which the guide rails 40A are attached.

The guide frames 40B, as shown in FIGS. 4–7, support the opposite ends of the film holding member 42 via a pair of rail members 48A which have an L shape in cross section and also have a predetermined length in a direction perpendicular to the film passage plane 12A.

A pair of pressure rollers 48B is rotatably mounted on opposite sides of each main vacuum suction plate 22 adjacent to the leading end thereof facing the base-plate conveyance plane I—I. The pressure rollers 48B are brought into rolling contact with the corresponding rail members 48A from a direction opposite to the base-plate conveyance plane I—I and they are rotated when the rail members 48A move in a direction perpendicular to the film passage plane 12A while the pressure rollers 48B are held in contact with the rail members 48A. The pressure rollers 48B and the rail members 48A jointly constitute a pressure mechanism 48.

Figure 9:
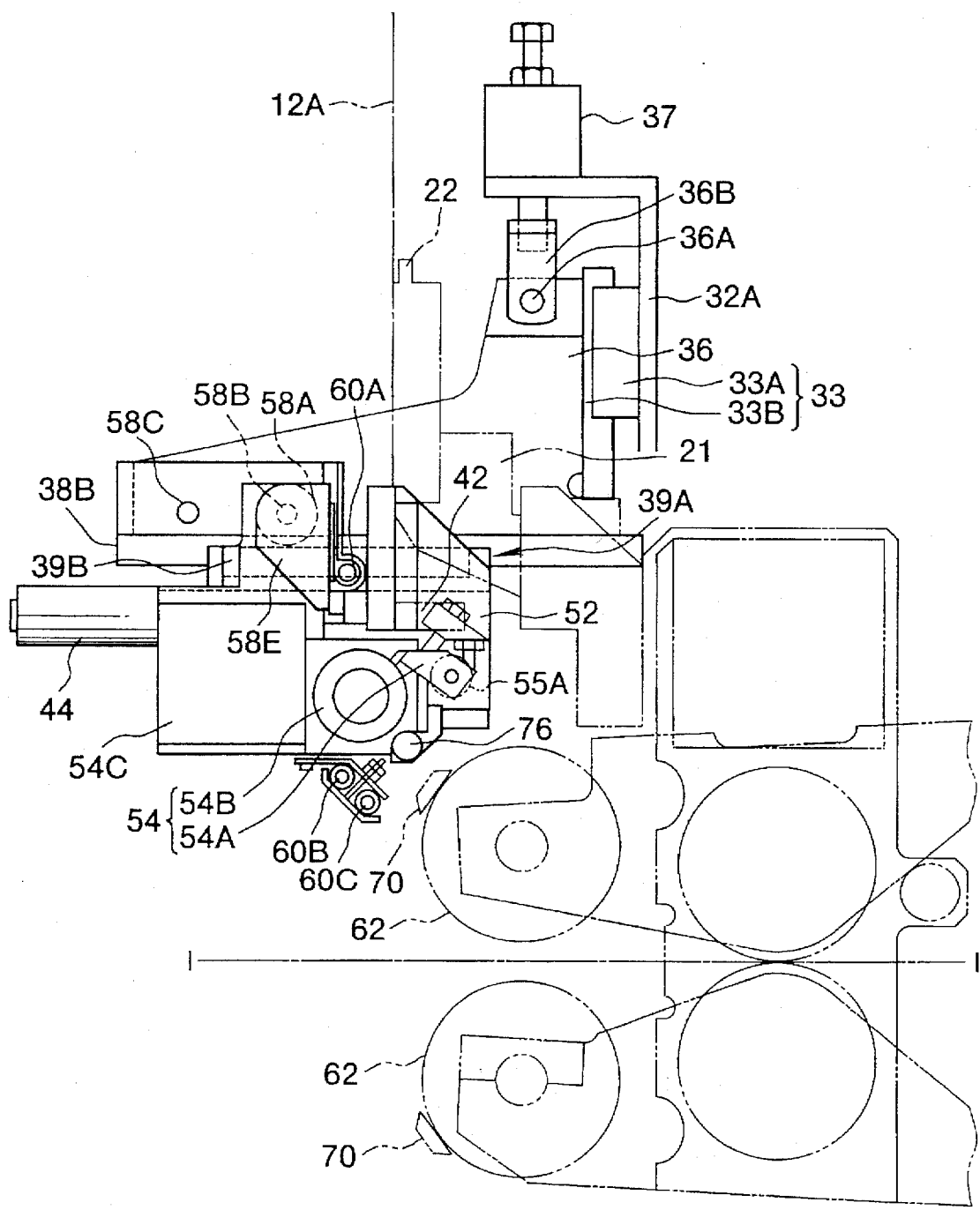
FIG. 9 is a cross-sectional view taken along the line IX—IX of FIG. 8.

As shown in FIG. 7 and 9, the stationary-knife supporting member 52 is attached to the stationary-knife supporting movable block 39A of each fore-and-aft guide rail 38. The stationary-knife supporting member 52 is connected to the front end of a piston rod of the pneumatic cylinder 44 mounted on a pneumatic-cylinder support member 45 secured to the support base 36, so that in response to operation of the pneumatic cylinder 44, the stationary knife 54A of the rotary cutter 54 is moved back and forth in a direction perpendicular to the film passage plane 12A.

The stationary-knife support members 52 support the stationary knife 54A such that when the film holding member 42 is forced by the main vacuum suction plate 22 toward the base-plate conveyance plane I—I, a tip edge of the stationary knife 54A is located adjacent to the base-plate conveyance plane I—I side of the film holding member 42.

The rotary cutter 54 is composed of the stationary knife 54A and the rotary knife 54B rotatable relative to the stationary knife 54A to cut off or sever the film by and between the stationary and rotary knives 54A and 54B. The rotary knife 54B has opposite ends supported by rotary-knife support members 56 attached to the rotary-knife supporting movable blocks 39B of the fore-and-aft guide rails 38 so that the rotary knife 54B can be moved toward and away from the film passage plane 12A. Designated by 54C is a servomotor for drivingly rotating the rotary knife 54B.

The rotary-knife support members 56 are provided with a pair of rotary-knife position-lock devices 58, 58, respectively, which lock the corresponding rotary-knife support members 56 in position at a cutting position in which the rotary knife 54B and the stationary knife 54A are brought into contact with each other to cut or sever the film 12, and a retracted position in which the rotary knife 54B is retracted from the film passage plane 12A in a direction away from the stationary knife 54A.

The rotary-knife position-lock devices 58 are each composed of a lock knob 58A having a toe receivable through an engagement hole extending through a corresponding one of the rotary-knife support members 56, two locking holes 58B, 58C formed in the corresponding support base 36 so as to be engaged with the toe of the lock knob 58A at the cutting position and the retracted position, respectively, and a lock spring 58D for urging the lock knob 58A inwardly, i.e., in a direction toward the support base 36.

Two confronting retainer plates 58E are disposed inwardly between the lock knobs 58A and each held in confrontation with a corresponding one of the lock knobs 58A. The retainer plates 58E extend laterally and inwardly from the corresponding rotary-knife support members 56. The retainer plates 58E are shaped and arranged such that each retainer plate 58E extends perpendicular to a central axis of the mating lock knob 58A and can retain or bear a first finger of one hand with the mating lock knob 58A gripped with a second and third fingers of the same hand.

Disposed respectively above and below the rotary-knife support members 56 are an air blow-off pipe 60A and a pair of air blow-off pipes 60B and 60C for blowing compressed air toward the film 12. The air blow-off pipes 60A–60C each have a number of air blow-off holes or apertures (not shown) formed on one side adapted to be faced with the film 12 and spaced at predetermined longitudinal intervals, such as 20 mm. An upper one 60B of the pair of air-blow pipes 60B and 60C disposed below the rotary-knife support members 56 is so constructed as to blow compressed air toward the leading end portion 21A of the tacking member 20 at the time of cutting the film 12, while the lower air blow-off pipe 60C is so constructed as to produce a stream of air between a vacuum suction bar 70 and a guide roll 76, described later on.

The left and right retainer plates 58E, provided in pairs, are integrally connected by the upper air blow-off pipe 60A in the widthwise direction of the film.

Each ends of the stationary knife 54A are supported by the stationary-knife support members 52 via radial bearings 55A with aligning ring, each ends of rotary knife 54B are supported by the rotary-knife support members 56 via radial bearings 55B with aligning ring, and the air blow-off pipe 60A is provided with a cushion (not shown), foam synthetic resin for example, between thereof and the left and right retainer plates 58E so that the stationary knife 54A and the rotary knife 54B together with the support base 36 are tiltable relative to a widthwise line of the film 12 in a plane parallel to the film passage plane 12A.

Reference character 62 denotes lamination rolls, 64 drive rollers of the base-plate conveyor mechanism, 66 a driven roller of the same mechanism, 68 a base-plate pressure member, 70 the vacuum suction bars for holding, by suction, the trailing film edges after severance of the respective films 12, 72 a base-plate-leading-end position detecting photosensor, and 74 a base-plate-trailing-end position detecting photosensor. Furthermore, reference character 76 denotes the guide rolls each disposed between the vacuum suction bar 70 and the stationary knife 54A for guiding the film 12 vertically at a position of the stationary knife 54A when the film is being cut or severed. Each of the vacuum suction bars 70 is rotatably disposed adjacent to the corresponding lamination roll 62 and moves or transfers a film 12 of a severed length to the vicinity of a contact surface between the film 12 on the base plate 26 and the lamination roll 62 at a speed equal to or slightly lower than the rotational peripheral speed of the lamination roll 62 while the severed film 12 is held on the vacuum suction bar 70 at or in the vicinity of the trailing end.

The base-plate pressure member 68 is composed of a base-plate pressure roller 68A, and a base-plate-pressure-roller drive pneumatic cylinder 68B for vertically reciprocating the pressure roller 68A. The lamination rolls 62 and the base-plate pressure member 68 are so related as described below.

The leading end of a base plate 26 being conveyed is detected by the base-plate-leading-end position detecting photosensor 72 disposed adjacent to the base-plate conveyance plane I—I, and after that when a predetermined time has elapsed, the base plate 26 has been conveyed to a film-tacking position whereupon the rotation of the drive roller 64 is stopped. At the same time, the base-plate pressure roller 68A is driven by the base-plate-pressure-roller drive pneumatic cylinder 68B to force the base plate 26 downwards.

By the base-plate pressure roller 68A, the movement of the base plate 26 is completely stopped or arrested. And even when the tacking member body 21 forming a leading end of the tacking member 20 comes into contact with the base plate 26, the base plate 26 cannot move with the result that the film 12 is reliably tacked onto the base plate 26.

Arresting of the base plate 26 by the base-plate pressure roller 68A continues until the lamination rolls 62 come into contact with the base plate 26. In synchronism with the contacting timing of the lamination rolls 62, the base-plate-pressure-roller drive pneumatic cylinder 68B is deactivated.

Referring now to FIGS. 10–12, operation of the film applying apparatus of the foregoing embodiment will be described below.

At first, the pneumatic cylinders 44 are activated to advance the stationary-knife supporting movable blocks 39A toward the film passage plane 12A. With this movement, the film holding members 42 and the corresponding stationary knives 54A are brought to the position of the film passage plane 12 while they are held in vertical juxtaposition. The tacking members 20 are driven by the servomotor 35 from the original position 22A toward the base-plate conveyance plane I—I whereupon the pressure rollers 48B force the film holding members 42 downwards (or upwards) via the rail members 48A until the film holding members 42 comes into close juxtaposition with the corresponding stationary knives 54A (manual cutting position 22B, see FIG. 10A).

On the other hand, the rotary-knife support members 56 are pulled in a direction away from the film passage plane 12A while the lock knobs 58A are being pulled out or unlocked. Then, the lock knobs 58A are fitted with the locking holes 58C, thus locking the rotary-knife support members 56 in this retracted position.

Now, there is defined, between the rotary knife 54B and the stationary knife 54A, a relatively wide space in which each film, unwound from the supply roll 14 and then separated from the cover film, is manually introduced. When a leading edge of the film 12 has passed the stationary knife 54A, the main vacuum suction plate 22, the tacking member body 21 and the film holding member 42 start performing negative suction to thereby hold the film 12 thereon by suction.

Then, the left-hand side support base 36 shown in FIG. 8 is moved up and down by the rotary-cutter angle adjusting device 37 to set the stationary and rotary knives 54A and 54B in such a condition that a cutting edge of the stationary knife 54A and an axis of rotation of the rotary knife 54B become parallel to a transverse axis of the film.

Thereafter, the lock knobs 58A are pulled out to unlock the rotary-knife support members 56 from the retracted position, then the rotary-knife support members 56 are driven toward the film passage plane 12A, and after that the lock knobs 58 are fitted with the locking holes 58B to lock the corresponding rotary knife 54B in the cutting position. Then, the rotary knife 54B is driven so that a leading edge portion of the film 12 extending forwardly from the stationary-knife 54A is cut off or removed by the stationary and rotary knives 54A, 54B. At this time, since the cutting edge of the stationary knife 54A is aligned at a right angle to the feeding direction of the film 12, the leading edge of the film 12 is cut at a right angle with respect to the feeding direction of the film 12.

When the lock knobs 58A of the rotary-knife position lock device 58 are unlocked from the locking holes 58B or 58C against the force of the springs 58D, the operator pulls out the lock knobs 58A, with its second and third fingers gripping the necks of the respective lock knobs 58A, while the first fingers are hooked on the retainer plates 58E which are disposed inwardly of, and in confrontation to, the corresponding lock knobs 58A in the widthwise direction of the film. Thus, the lock knobs 58A can be released or unlocked with excellent manipulatability without requiring an uneasy working posture.

Then, the pneumatic cylinders 44 are activated to drive the stationary-knife supporting movable blocks 39B in a direction to move the film holding members 42 and the stationary-knife support members 52 away from the film passage plane 12A.

In this instance, since the leading edge of each film 12 is held by suction on the film holding member 42, the leading film edge is, as shown in FIG. 10B, pulled toward the main vacuum suction plate 22 of the tacking member 20 and further along the rounded surface of the tacking member body 21 so that the leading film edge is forced against thereon. Thus, the leading film edge is separated from the film holding member 42 and held by suction on the tacking member body 21.

When the film holding member 42 and the stationary-knife support members 52 are spaced from the film passage plane 12A by a predetermined distance, the rail members 48A formed on the tacking member side of the film holding member 42 are brought out of rolling engagement with the pressure rollers 48B.

Accordingly, the compression coil springs 40D are released from a compression force and hence allowed to expand to restore their original length with the result that the film holding member 42, the guide frames 40B supporting the film holding member 42, and the floating shafts 40C are driven in a direction away from the stationary knife 54A to assume the position shown in FIG. 10C.

As a result of backward movement or retraction of the film holding member 42 and the stationary knife 54A, the tacking member 20 is movable toward the base plate 26 without interference with the film holding member 42 and the stationary knife 54A. The tacking member 20, as illustrated by the phantom likes in FIG. 11A, is driven by the servomotor 35 until it arrives at the tacking standby position 22D, whereupon it is stopped.

Figure 11A:
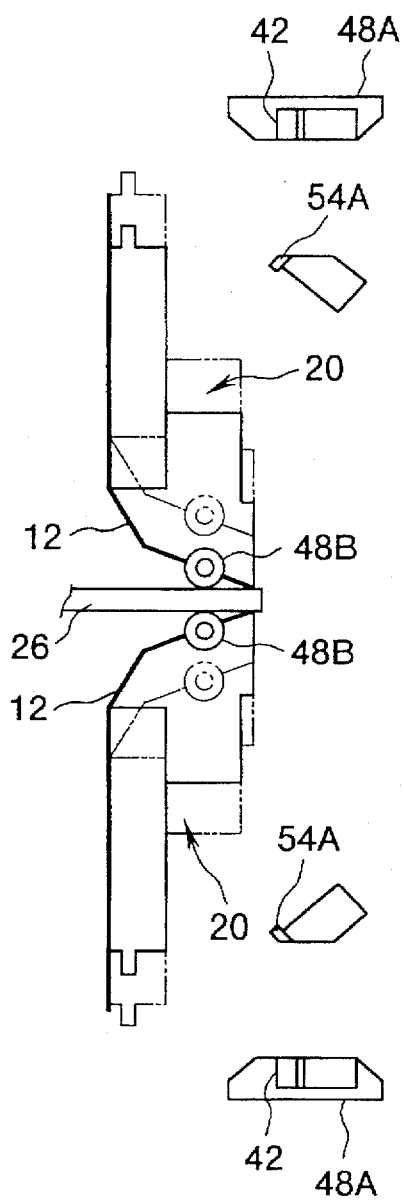
FIGS. 11A and 11B is a schematic cross-sectional view showing a succession of intermediate stages of operation of the apparatus in same embodiment.

Then, a leading end of the base plate 26 is detected by the base-plate-leading-end position detecting photosensor 72 and thereafter, at a predetermined timing, the tacking member 20 is driven toward the base plate 26 by means of the pneumatic cylinders 30 whereby, as indicated by the solid lines in FIG. 11A, the leading edge of the film 12 wrapped around the tacking member body 21 is temporarily applied or tacked onto the leading end of the base plate 26 under pressure and heat by the heater embedded in the leading end portion 21A.

In this instance, since the tacking process of the film 12 relative to the base plate 26 is achieved under the action of the pneumatic cylinders 30, variations in thickness of the base plates 26 can be taken up or canceled by a damping action of the pneumatic pressure, and a sufficient tacking pressure can always be obtained, accordingly. Tacking can, therefore, be achieved with high reliability.

Figure 11B:
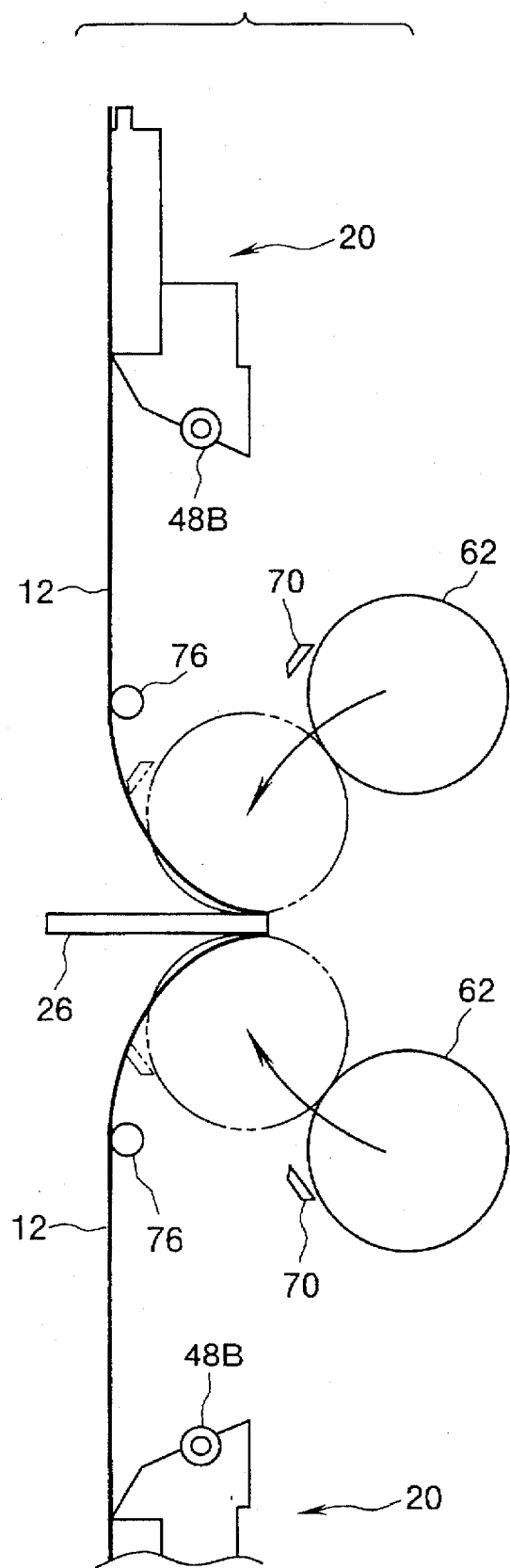

When tacking of the leading film edge is started, the negative pressure acting on the tacking member 20 ceases, and after that when a preset time has expired, the tacking member 20 is driven jointly by the pneumatic cylinders 30 and the servomotor 35 in a direction away from the base plate until it arrives at the switching position 22F, as shown in FIG. 11B. The distance between the tacking pressure bonding position 22E and the switching position 22F is set to be constant. From the switching position 22F to the original position 22A, the tacking member 20 is driven only by the pneumatic cylinders 30 so that variations in the distance from the switching position 22F to the original position 22A, which may be caused by variations in thickness of the base plates 26, can be taken up by a damping action of the pneumatic pressure.

During the retracting movement of each tacking member 20 away from the base plate 26, the lamination roll 62 is moved to the leading end of the base plate 26, and the base plate 26 is conveyed by the drive roller 64, whereupon the film 12 is bonded with heat and pressure to the base plate 26 by the lamination roll 62.

Before the heat-and-pressure-bonding is started, the film holding member 42 and the stationary knife 54A are advanced to the film passage plane 12A by means of the pneumatic cylinders 44 via the stationary-knife supporting movable blocks 39A. At this time, the film holding member 42 is spaced from the stationary knife 54A to the tacking member 20 side, as shown in FIG. 12A. The vacuum suction bar 70 is driven in synchronism with the lamination roll 62 to assume a position on the film passage plane 12A.

The stationary knife 54 and the rotary knife 54B are tilted by the rotary-cutter angle adjusting device 37 such that the cutting edge of the stationary knife 54A and the central axis of the rotary knife 54B are tilted at an angle about 5° in a direction opposite to the skew angle of the cutting edge of the rotary knife 54B. This arrangement makes it possible to minimize the skew of a leading edge of the film even if cutting is achieved while the film is in motion.

Figure 13:
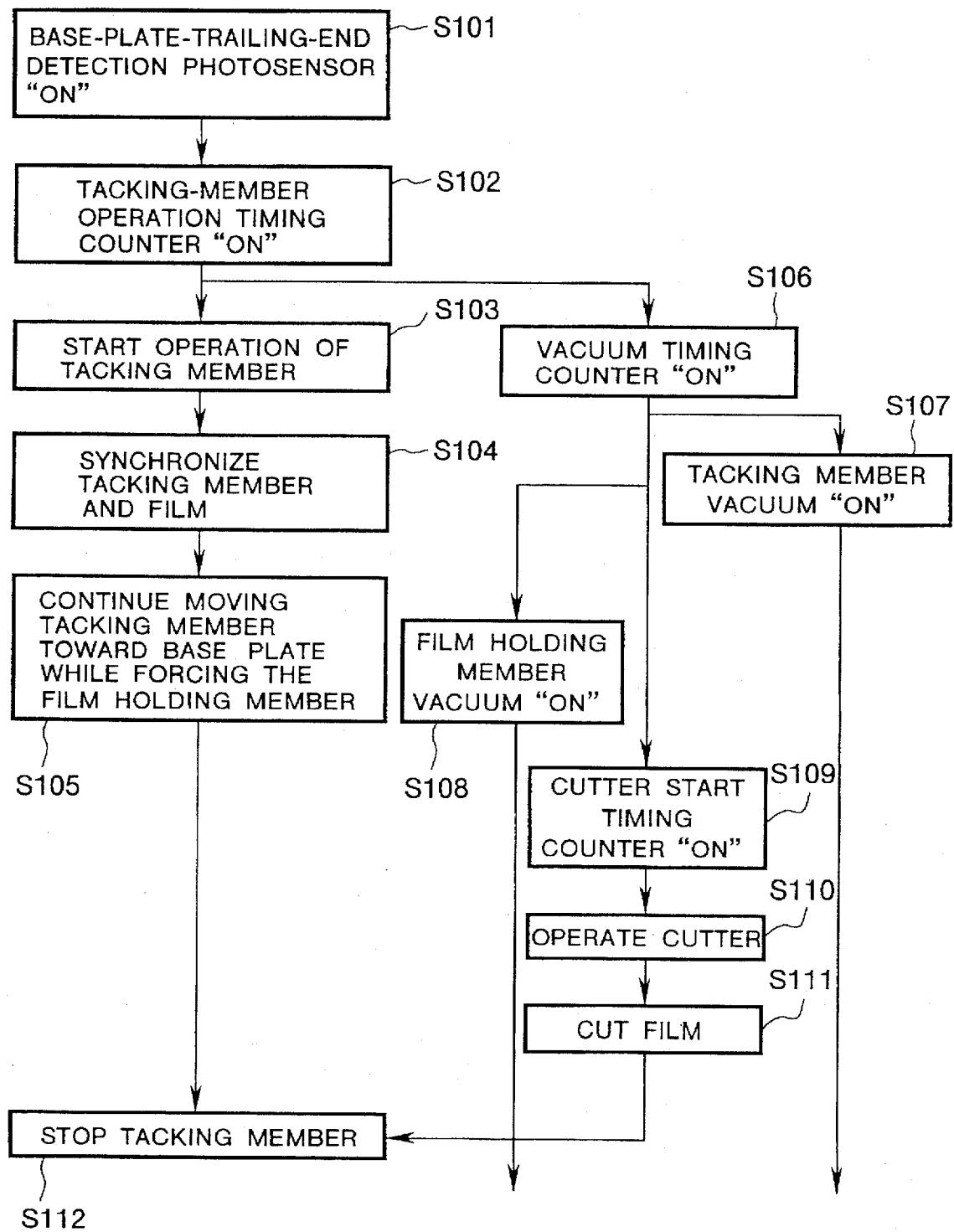
FIG. 13 is a flowchart showing a sequence of operations of the tacking member and the film holding member achieved when films are cut or severed.

When the base-plate-trailing-end position detecting photosensor 74 detects the trailing end of the base plate 26 being conveyed and applied with the films 12 (S101 shown in FIG. 13), a tacking-member operation-timing counter is turned ON or activated (S102). After that when a predetermined time has elapsed, the tacking members 20 are driven by the servomotor 35 to start moving along the guide rails 28 toward the base plate 26 in synchronism with the films 12 (S103 and S104). With this movement of the tacking members 20, the pressure rollers 48B are brought into contact with the film holding members 42 and then forces them to move toward the base plate 26, in synchronism with the movement of the film 12, against the force of the compression coil springs 40D to the respective positions close to the stationary knives 54A (S105).

When the tacking-member operation-timing counter outputs an ON signal, the same ON signal is simultaneously input to a vacuum timing counter (S106).

When a predetermined time has elapsed, the vacuum timing counter outputs an ON signal instructing in sequence the tacking members 20 and the film holding members 42 to create vacuum suction (S107 and S108). The vacuum suction bars 70 also create vacuum suction, so that the films 12 can be sucked or held by suction on the tacking members 20, film holding members 42 and the vacuum suction bars 70. The vacuum suction creating timing is determined such that when movement of the tacking member 20 toward the base plate 26 is synchronized with the movement of the film 12, the tacking member 20 begins performing vacuum suction (vacuum ON); and when the tacking member 20 comes into pressure contact with the film holding member 42 and moves in synchronism with the latter, the film holding member 42 begins performing vacuum suction (vacuum ON).

The ON signal from the vacuum timing counter is also output to a cutter start timing counter (S109), and when a predetermined period of time has elapsed, the servomotors 54C drive the corresponding rotary knives 54B (S110) to cut or sever the films 12 between the rotary knives 54B and the stationary knives 54A (S111). During severance of the films, the tacking members 20, film holding members 42 and the films 12 are moved toward the base plate 26, and after severance of the films, they are stopped when the film holding members 42 come to a position adjacent to the corresponding stationary knives 54A (S112). It was found that when a rotational peripheral speed of the cutting edges of the rotary knives 54B is made twice or more as fast as the moving speed of the films 12, cutting can be achieved smoothly without causing undue tensioning of the films 12 or objectionable entanglement of the films 12 even when the films 12 are cut while in motion.

The tailing edges of the cut-off or severed films 12 are subjected to streams of air blown from the air blow-off pipes 60B and thereby blown in such a manner as to wrap around the guide rolls 76, as shown in FIG. 12B.

As the pressure application or bonding of the films 12 by the lamination rolls 62 proceeds, the trailing edges of the severed films 12 are continuously moved toward the base plate 26. When the trailing film edges have passed the guide rolls 76, a changeover valve (not shown) is activated to change the pass of supply of compressed air from the air blow-off pipes 60B to the air blow-off pipes 60C.

The trailing edges of the severed films 12 are, therefore, forced to float in such a manner as to wrap around the corresponding vacuum suction bars 70, as indicated by the phantom lines in FIG. 12B. It is to be noted that since the process goes on from the condition shown in FIG. 10A to the condition shown in FIG. 10B while streams of air are blown from the air blow-off pipes 60B toward the leading end portions 21A of the tacking members 20, the air streams force the leading edges of the films 12 against the rounded suction surfaces of the respective tacking member bodies 21 and the leading end suction surfaces of the respective film holding members 42, thus preventing the films 12 from displacing off from the tacking member bodies 21 and the film holding members 42.

The trailing edges of the severed films 12, which are wrapped around the vacuum suction bars 70, are immediately held thereon by suction by means of which the trailing edges of the films 12 are tensioned while the films 12 are heat-and-pressure bonded to the base plate 26 by the lamination rolls 62. Thus, a first run or cycle of film applying process is completed.

After the heat-and-pressure-bonding of the films 12 to the base plate 12 completes, the procedures return to the initial condition shown in FIG. 10A (original position 22A), the procedures shown in FIGS. 10A through 12B will be repeated to apply the films with heat and pressure to the next base plate 26 in the same manner described above.

Although the embodiment described above utilizes many pneumatic cylinders in various parts, the air cylinders may be cylinder devices of the fluid-pressure operated type, such as oil-pressure cylinders, hydraulic cylinders or gas cylinders.

According to the above embodiments, since the tacking member, until its arrival at a position close to the base plate, is driven by the motor while the position of the tacking member is controlled according to a number of revolution of the motor, and during pressure-bonding, it is driven by the cylinder device. With this arrangement, a difference in thickness between the base plates can be taken up or canceled by the pneumatic pressure of the cylinder device and, hence, the films can be applied reliably to the respective base plates.

It is also possible to return the tacking member to the original position in a short period of time by means of the cylinder device while the position of the tacking member is controlled according to a number of revolution of the motor.

Furthermore, the tacking member while being held in a standby condition in the vicinity of the base-plate conveyance plane can readily perform film-tacking operation as soon as the base plate is conveyed. As a result, operation time of film applying can be reduced.

It is also possible to perform uniform and reliable application of two films to opposite surfaces of the base plate by a sequence of operation in which after one tack member is brought into contact with one surface of the base plate, the other tack member is forced against the other surface of the same base plate.

Since the film holding member and the stationary-knife support members are independently supported on the movable rails of the fore-and-aft guide rails, they can be reliably driven for reciprocating movement toward and away from the film passage plane, without generating a bending force or a shearing force. Accordingly, as against the prior art, the present invention is completely free from a malfunction of the film holding member.

Furthermore, since the tacking member forces the film holding member toward the stationary knife via the pressure mechanism, and since the thus forced film holding member is retractable to a position held out to interference with the tacking member, the film holding member can be positioned accurately and reliably without requiring a complicated control mechanism for driving the same.

By virtue of the pressure mechanisms, when the film holding means is spaced from the film, the tacking member is able to move toward the base plate beyond the film holding member to tack the film onto the base plate.

The pressure mechanisms each include a pressure member composed of a roller for forcing the film holding member toward the base plate, and a rail provided on the film holding member and movable relative to the roller in a direction perpendicular to the film passage plane. With this arrangement, the film holding member while being held in pressure contact with the tacking member can be displaced in a direction perpendicular to the film passage plane toward a retracted position where the film holding member is held out of interference with the roller. When the film holding member is in the retracted position, the tacking member is permitted to move toward the base plate.

Since the rotary knife is supported by the rotary-knife support device which is movable along the guide rails, the rotary knife no longer requires a separate guide mechanism but can be displaced while keeping an accurate position relative to the stationary knife.

The retainer plates each provided in confrontation to one of two opposed knobs used for locking the rotary-knife support device relative to the guide rail side member at a cutting position in which the rotary and stationary knives come into contact with each other, and at a retracted position in which the rotary and stationary knives are separated from each other. By manipulating the knobs with second and third fingers hooked on the knobs while the first fingers are hooked on the retainer plates, the operator can unlock the rotary-knife support device from the guide rail side, without taking an uneasy working posture.

The retainer plates, which are disposed in a pair on the right and left sides in the widthwise direction of the film, are interconnected in the widthwise direction of the film by means of the air blow-off pipe, so that the stiffness of the air blow-off pipe and the retainer plates can be increased significantly.

What is claimed is:

1. A film applying apparatus of the type, wherein a continuous film composed of a light-transmissible support film, a photosensitive resin layer and a cover film laminated in the above order is withdrawn from a film supply roll, and after the cover film is separated, the continuous film is guided to the vicinity of a leading end of a base plate conveyed by a conveying means, with the photosensitive resin layer situated on a base plate side, while the film is held by suction on a tacking member which is movable toward and away from the base plate and also on a film holding member which is disposed adjacent to the tacking member at a base plate side thereof, subsequently the film holding member is retracted for causing a leading edge of the film to wrap around the leading end of the tacking member, then the leading edge of the film is tacked onto the leading end of the base plate by the tacking member, thereafter the film is pressure-bonded to the base plate by lamination rolls while the base plate is being conveyed, wherein when said pressure-bonding is started, the tacking member is spaced from the base plate along a film passage plane, and subsequently the film is cut at a position close to the film holding member by a rotary cutter composed of a rotary knife rotatable about an axis of rotation extending parallel to the film passage plane, and a stationary knife movable toward and away from the rotary knife, wherein when the film is cut, the film holding member is advanced to the film passage plane to hold the film thereon by suction together with the tacking member, said apparatus further includes; a pair of support bases attached to a body of said apparatus at positions outside opposite ends of said stationary knife in the widthwise direction of the film and movable in a direction parallel to the direction of feed of the film, a pair of fore-and-aft guide rails, wherein each one of said fore-and-aft guide rails is disposed on each one of said support bases, respectively, and extending in a direction perpendicular to said film passage plane, and a pair of stationary-knife support members and a pair of film-holding-member support mechanisms, wherein each one of said stationary knife support members and each one of said film-holding-member support mechanisms are supported by a pair of movable blocks, respectively, of each one of said fore-and-aft guide rails, wherein said stationary-knife support members support said opposite ends of said stationary-knife and said film-holding-member support mechanisms support opposite ends of said film holding member, wherein each of said film-holding-member support mechanisms includes a spring supporting the film holding member while permitting movement of the film holding member along said film passage plane within a range of distance and urging the film holding member in a direction away from a base-plate conveyance plane, and wherein a pressure mechanism is provided between said film holding member and said film-holding-member support mechanisms for forcing said film holding member against the force of said springs when said tacking member comes close to said film holding member and allowing said tacking member to move toward the base plate beyond said film holding member when said film holding member is spaced from the film.

2. A film applying apparatus according to claim 1, wherein said pressure mechanism includes a pressure member which is provided on one side and adjacent a leading end of the tacking member, disposed at a position offset toward the base plate from the leading end and which is engageable with said film holding member to force the base plate when said tacking member moves toward the base plate.

3. A film applying apparatus according to claim 2, wherein said pressure member comprises a roller having an axis of rotation extending parallel to the widthwise direction of the film, each said pressure mechanism is composed of said roller, and a rail extending in a direction perpendicular to said film passage plane and disposed in a corresponding one of said film-holding-member support mechanisms at a portion engageable with said roller, so as to permit said film-holding-member support mechanism to move while keeping contact with said roller at said rail, said rail extending over a limited length within which said film holding member and said tacking member are in contact with each other in the feed direction of the film.

4. A film applying apparatus according to claim 1, wherein said apparatus further includes two rotary-knife support devices for movably supporting opposite ends of said rotary knife along said pair of fore-and-aft guide rails and enabling said rotary knife to be fixed at a cutting position in which said rotary knife cooperates with said stationary knife set on said film passage plane to cut the film, and a retracted position spaced away from said film passage plane.

5. A film applying apparatus according to claim 4, wherein said rotary-knife support devices include a locking projection engageable, at said cutting position and said retracting position, with recessed portions formed in a fixed-rail side of each said fore-and-aft guide, and a spring urging said locking projection toward a projecting direction.

6. A film applying apparatus according to claim 5, wherein said locking projection is disposed on said fixed rail at an inner side in the widthwise direction of the film and movable to and fro in a widthwise direction of the film, and has a knob at its proximal end, said rotary-knife support device further includes a retainer plate disposed at an inner side in the widthwise direction of the film of, and in confrontation with, said knob such that when said knob is gripped with second and third fingers, a first finger can be hooked on said retainer plate.

7. A film applying apparatus according to claim 6, wherein said locking projection, said knob and said retainer plate are provided in one pair on right and left sides in the widthwise direction of the film, wherein said right and left retainer plates are connected together in the widthwise direction of the film by an air blow-off pipe which is parallel to said rotary knife, disposed close to said film passage plane, and provided for blowing compressed air to the film.

* * * * *